Dec. 14, 1965  SATORU OUCHI  3,222,983
AUTOMATIC EXPOSURE TIMING MEANS
Filed May 16, 1962  2 Sheets-Sheet 1

INVENTOR.
SATORU OUCHI
BY Stanley Wolder
ATTORNEY

Dec. 14, 1965  SATORU OUCHI  3,222,983
AUTOMATIC EXPOSURE TIMING MEANS
Filed May 16, 1962  2 Sheets-Sheet 2
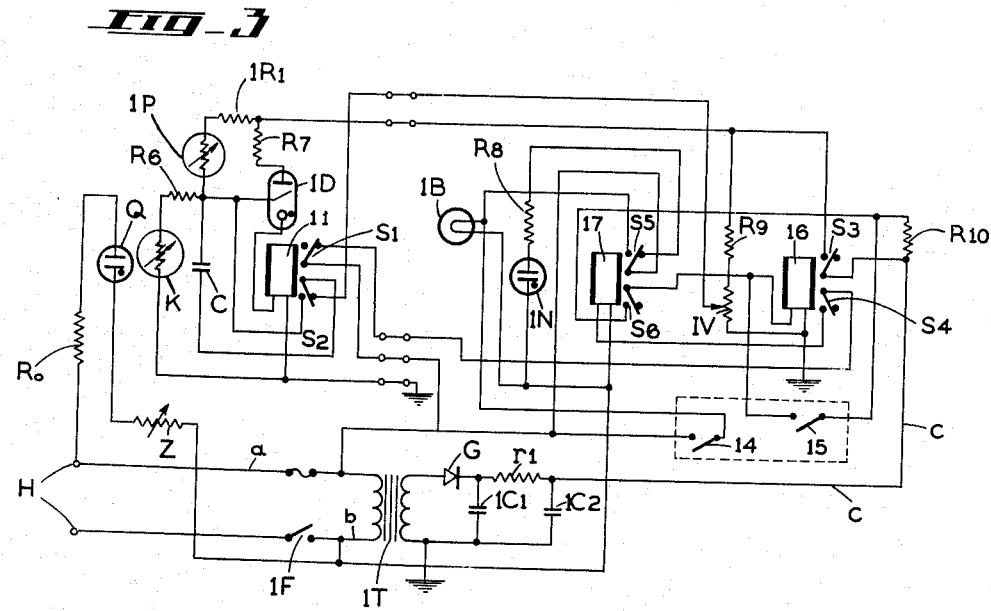
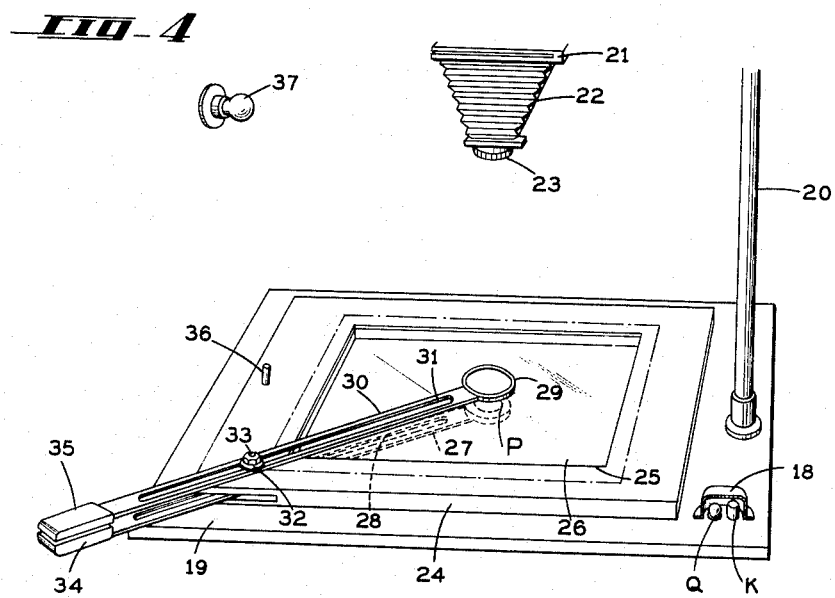
INVENTOR.
SATORU OUCHI
BY
Stanley Wolder
ATTORNEY

United States Patent Office 3,222,983
Patented Dec. 14, 1965

3,222,983
AUTOMATIC EXPOSURE TIMING MEANS
Satoru Ouchi, 1060 3-chome Kitazawa, Setagaya-ku, Tokyo, Japan
Filed May 16, 1962, Ser. No. 195,243
11 Claims. (Cl. 88—24)

The present invention relates generally to improvements in photographic printing and enlarging apparatus and it relates more particularly to an improved apparatus for automatically controlling the exosure time of photographic enlargers and printers.

The exposure time necessary for obtaining a desirable print by projecting the image of the negative on the photographic printing paper by means of an enlarger is a function of the negative density, the adjusted diaphragm value or aperture of the enlarging lens, the light source, the enlargement factor and the sensitivity of the sensitized printing paper.

The negative density determines the exposure time of an enlarger because in enlargement printing an overexposed or overdeveloped negative requires a longer enlargement exposure time than that required for a properly exposed and properly developed negative, while in the case of negatives which have been underexposed or underdeveloped the enlargement exposure time is shortened.

It is, however, sometimes necessary that, depending on the nature of the scene to be photographed, a high density negative should be exposed for a comparatively short time or on the contrary a low density negative be exposed for a comparatively long time. One practical example of the former is a photograph of a person with a snow covered background. An example of the latter is a photograph of an outside scene from within a tunnel. In the former case, if the greater part of the negative surface is occupied by the snow covered background and the person occupies only a small part of it, then the negative as a whole is of high density. A long enlargement exposure of such a negative would result in the snow view not being of a natural white but of a somewhat grayish tone and the person appearing as an unnaturally dark figure. Therefore, in this case a comparatively short enlargement exposure time with respect to the negative density would be appropriate. In the latter case, if the darkness within the tunnel occupies the greater part of the negative surface, and only a very small part of it is exposed to the outer scene, then the negative as a whole is of low density. In this case, if the negative is developed with a comparatively short enlargement exposure time, then the resulting picture would present not a dark but a dusky appearance of the interior of the tunnel while the scene outside the tunnel would be of unnaturally whitish tone on the same picture.

In view of the above, although the enlargement exposure time should ordinarily be a factor of negative density, it cannot be said that negative density is the proper standard for controlling the exposure time of all kinds of negatives. Accordingly, what is called the average illumination measuring system which measures the whole pencil of projecting rays at the moment of negative image enlargement by means of a photographic enlarger would not result in a correct measurement of the enlargement exposure time.

Therefore, in view of the above fact, the primary object of the present invention is to provide a novel apparatus which enables the operator to select and make light measurement of a part of the projected image to enable an optimum print, to secure the maximum information and appearance from the negative employed. In practice, a mid-density section of the negative would be selected for light measurement out of a wide tone range from high to low density. Accordingly, the present invention introduces a partial illumination measuring system characterized by a light receiving element for light measurement which is so arranged as to be movable freely under the projected image.

It has been common practice in all enlargement procedures to carry out "Trial Printing" prior to the actual printing by projecting light. This operation requires the process of enlargement and development which is of the same nature as that for the actual enlargement operation, calls for therefore, at least double the labor and double the time otherwise necessary. Even if an electrical light measurement operation is adopted instead of trial printing, a separate light measuring operation is necessary in addition to the enlargement and development operation for obtaining the picture. In this case the enlargement and development operation must be carried out on the basis of the exposure time obtained from said light measuring operation. Accordingly, the additional light measuring operation cannot be eliminated and the operation cannot be efficiently performed.

The second object of the present invention is to provide an apparatus which enables the operator to perform the operation readily and quickly without such additional operation as mentioned above by making the necessary light measurement in the course of the enlargement operation, using the enlarging light rays projecting over the printing paper and effecting such automatic control that the enlarger light source is switched off when the printing paper has received the appropriate amount of light. For this purpose the light receiving element receiving the light rays of the selected part of the projected image cannot be positioned between the enlarger light source and the printing paper and therefore this element is placed under the printing paper.

Even with such an automatic exposure time control system there still are many problems in effecting a highly accurate control in actual operation. For example, when the exposure and automatic control operations are being carried out, there would be no problem if the light circuit is so arranged that the safe light of the dark room is switched off as soon as the enlarger light source is switched on, however, if such arrangement is not made, in addition to the enlarger light rays for the printing paper, at the same time the dark room light which exerts no influence on the printing paper but affects the light receiving element, passes through the printing paper and falls on the light receiving element placed under the printing paper. Accordingly, the light received for automatic control includes the dark room safe light which has no relation to light affecting the printing paper. This safe light adversely affects the accuracy of automatic control, by causing a premature switching off of the enlarger light source resulting in underexposure of the printing paper.

In this case, the less the enlarging lens diaphragm aperture becomes, the less exposure is given to the printing paper. This will be clear from the following explanation. It is well known that in an enlargement operation using an ordinary enlarger having no automatic control means, if an appropriate exposure is obtained with the enlarger lens diaphragm $f/4$ and the exposure time $t$ seconds, then the same amount of exposure light would be obtained also from the following combinations of smaller diaphragm and corresponding exposure time:

| | Seconds |
|---|---|
| $f/5.6$ | $2t$ |
| $f/8$ | $4t$ |
| $f/11$ | $8t$ |
| $f/16$ | $16t$ |
| $f/22$ | $32t$ |

Let us suppose that an effective whole light amount M reaches the printing paper in each of the above cases.

Considering now the light amount reaching the light receiving element positioned under the printing paper, in addition to the whole exposure light amount M which is effective on the printing paper, the dark room safe light having no effect on the printing falls upon the printing paper. Although the dark room safe light has no effect on the printing paper, it is effective on such light receiving elements as photoelectric tubes or photoelectric cells. Let the quantity of dark room safe light falling every second on the light receiving body after it has passed through the printing paper be represented by L and the loss amount of the printing paper effective enlarger light due to reflection from and absorption by the printing paper be represented by $d$, then the whole light amounts falling upon the light receiving element for the aforementioned diaphragm values are respectively:

| | |
|---|---|
| $f/4$ | $(M-d)+Lt$ |
| $f/5.6$ | $(M-d)+2Lt$ |
| $f/8$ | $(M-d)+4Lt$ |
| $f/11$ | $(M-d)+8Lt$ |
| $f/16$ | $(M-d)+16Lt$ |
| $f/22$ | $(M-d)+32Lt$ |

Accordingly, the whole light amount received by the light receiving element increases as the diaphragm aperture becomes smaller, and therefore if the automatic control apparatus is so arranged as to be actuated by a definite whole light amount $M-d$ falling on the light receiving element, then this apparatus must necessarily be actuated after a lapse of shorter time as the diaphragm aperture decreases. Thus, the smaller the enlarger diaphragm aperture, the greater the degree of the underexposure.

The third object of the present invention is therefore to provide an apparatus which it free from the above mentioned undesirable influence of the dark room safe light but which can nevertheless perform an accurate automatice exposure control operation. For this purpose the present invention proposes an apparatus which is so arranged that the output current due to the dark room safe light falling on the light receiving photoelectric tube or photoelectric cell does not flow into a condenser for automatic control purpose so that only the output current which is produced by said light amount $M-d$ and is therefore necessary for the automatic control, can charge the condenser. In practice, a shunt circuit is arranged parallel to the condenser charging circuit. A light receiving element such as photoelectric tube which is of the same kind as the element positioned under the printing paper and which is so arranged as to receive the dark room safe light corresponding to that received by said element positioned under the printing paper, is inserted in said shunt circuit. In order that this compensating photoelectric tube in the shunt circuit can be under the same conditions relative to the safe light as that of the control photoelectric tube under the printing paper, the dark room safe light on the compensating photoelectric tube is placed under an optical control, for example non-adjustable light limiting devices such as an opal glass or a neutral density filter, or if necessary, adjustable devices such as an iris diaphragm or crossed polarizing screens.

There are some difficulties in the adjustment of such a dark room safe light compensating device. For example, if the compensating photoelectric tube is so placed on the enlarger stand that the printing paper is positioned between the compensating photoelectric tube and the dark room safe light source, as when by inadvertence of the operator during the enlargement operation, the printing paper is caused to overlie the photoelectric tube, then accurate compensation is difficult. If, to avoid such inconvenience the compensating photoelectric tube is removed from the enlarger stand to another place, then owing to the change of distance from the dark room safe light source it becomes very difficult to cause the dark room safe light falling on the compensating photoelectric tube to correspond to that falling on the control photoelectric tube.

The fourth object of the present invention is to provide a device for coping with the above situation. In this device, the compensating photoelectric tube does not utilize and is completely isolated from the dark room safe light, and only a light issuing from different source falls on the compensating photoelectric tube. Of course the light from a different source optically corresponds to the dark room safe light falling on the control photoelectric tube under the printing paper, or the light is so adjusted in accordance with the electrical characteristics of the compensating photoelectric tube that the same photoelectric effect as in the former case is produced.

Other objects of the present invention will be understood from the following detailed explanation of the embodiments when read with reference to the attached drawings in which:

FIGURE 3 is a schematic view of another automatic exposure time control network employing safe light compensating means; and FIGURE 4 is a perspective fragmentary view of an enlarger embodying the present invention.

Figure 1:
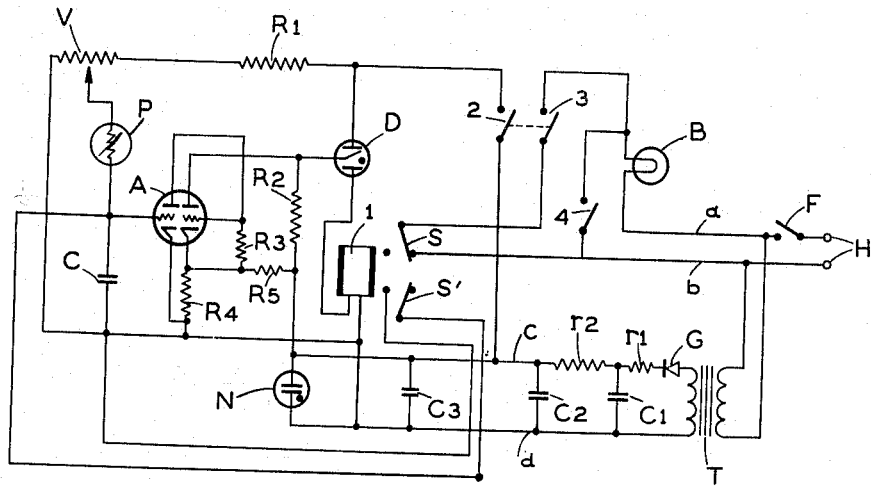
FIGURE 1 is a schematic view of a circuit network for the automatic exposure time control in accordance with the present invention.

Referring now to FIGURE 4 of the drawing, the reference numeral 19 generally designates an enlarger stand, upon which there is vertically mounted a standard or support 20 and which vertically adjustably carries (by conventional means not shown) a lamp housing which bears a negative inserting frame 21 attached thereunder, a bellows 22, and an adjustable aperture enlarger lens 23. A base plate 24 is located on the stand 19 and registers with the shifting optical axis of the enlarger lens 23. The base plate 24 is provided with a window 25 which is of about the same size and shape as those of the largest sheet of printing paper used. A glass plate 26 is set in window 25. The dot-and-dash line is intended to show the position of the largest sheet of the printing paper used. An arm 27 supporting at its inner free end a control photoelectric tube P is universally movable along a plane under the glass plate 26 and is provided with a longitudinally guide slot 28. Over the base plate 24 there is provided another arm 30 for supporting at its inner end an index member 29 which is of the same frame shape as that of the light receiving surface of the control photoelectric tube P. Arm 30 is provided with a guiding slot 31 which is of the same length and shape as those of the aforementioned guiding slots 28. The arms 27 and 28 are movably mounted to the base plate 24 by means of a shaft 33 which passes through said guiding slots 28 and 31 and is provided with a suitable washer ring 32. Shown further in the drawing are handle members 34 and 35 attached to the outer ends of the arms 27 and 30 respectively, a stop 36 and a bulb 37 which constitutes the dark room safe light.

The supporting arm structure is very effective in properly positioning the control photoelectric tube P under the printing paper. In determining the position of the tube P under a sheet of white paper on which the image is to be projected, the handles 34 and 35 are held together and moved along the registered guiding slots 28 and 31 or swung about the shaft 33 so that the control photoelectric tube P can be brought under any desired part of the projected image. In this operation index member 29 is kept in registration with the control photoelectric tube P positioned under the paper, so that when said index member 29 is positioned over and registers with the selected part of the projected image, the control photoelectric tube P is positioned directly under this part. Then, the control photoelectric tube P is left in position while handle 35 only is moved so that arm 30 together with index member 29 is swung away from the window until it abuts against the stop 36. Hence, when the projection light is actuated no shadow of arm 30 and the index member 29 is cast and the control photoelectric tube P receives light at the desired position.

In FIGURE 1 of the drawings there is illustrated a circuit network which is employed with the above described enlarger for the automatic control of the energization time of the enlarger light source lamp B and hence the enlarging or printing exposure time. The network includes a pair of lines $a$ and $b$, the line $a$ being connected to one terminal H of an alternating current source through a main power switch F and the line $b$ being connected to the other terminal H. The primary of a power transformer T is connected to the lines $a$ and $b$ and the secondary thereof is connected to the positive and negative direct current lines $c$ and $d$ by way of a rectifying and filtering network. The rectifying and filtering network includes series connected resistors $r1$ and $r2$ having one end connected to line $c$ and the other end to the cathode of a rectifier G the anode of which is connected to one terminal of the transformer secondary, the other terminal of which is connected to line $d$. The line $d$ is connected through a capacitor C1 to the junction of resistors $r1$ and $r2$ and through capacitors C2 and C3 to line $c$. A neon signal lamp N is connected between lines $c$ and $d$.

The photosensitive member P is of the type in which the resistance (or current passing through when the voltage is constant) varies with the incident light and may be a photoresistor element or a photoelectric tube as illustrated, and has its anode connected to the arm of a potentiometer V the resistance element of which has one terminal connected to negative line $d$ and the other terminal through a resistor R1 and a switch 2 to positive line $c$. The cathode of photoelectric tube P is connected to the first control grid of an amplifier double triode tube A and one terminal of a control capacitor C the other terminal of which is connected to the first cathode of tube A and to negative line $d$. The first anode of tube A is connected to the second grid of tube A and also by way of series resistors R3 and R5 to positive line $c$, the junctions of resistors R3 and R5 being connected to the second cathode of tube A which in turn is connected to negative line $d$ by way of a resistor R4. The second anode of tube A is connected to the control grid of a grid-controlled gas discharge tube D and by way of a resistor R2 to positive line $c$. The anode of the tube D is connected by way of switch 2 to positive line $c$ and the cathode is connected through the relay solenoid 1 to negative line $d$. Associated with and actuated by the solenoid 1 are the normally closed switch S and the normally open switch S'. The lamp B has one terminal connected to line $a$ and the other terminal connected to line $b$ by way of a switch 4 and by way of the series connected switch 3 ganged with the switch 2 and the relay switch S. The switch S' is connected across the capacitor C.

In employing the present enlarger with the network described above, the capacitor C being initially discharged and the tube D extinguished, the switch 4 is first closed to energize the enlarger lamp B and a white sheet is placed on the glass plate 26. The enlarger is then adjusted to focus an image of the desired magnification of the picture negative onto the white sheet and the lens aperture is then adjusted. The arms 28 and 30 are then simultaneously similarly adjusted to bring the control section of the image in concurrent registration with the index member 29 and the photoelectric tube P (normally a section of the image of medium density) and the index member is then swung out of registry with the window 25. It should be noted that the potentiometer V is earlier adjusted in accordance with the sensitivity and light transmission properties of the print paper and it may be provided with corresponding identifying indicia.

The switch 4 is then opened and a sheet of photographic paper is placed on the glass sheet 26. The ganged switches 2 and 3 are then closed. The closing of switch 3 effects the energization of lamp B by connecting it across lines $a$ and $b$ through the closed relay switch S thereby effecting exposure of the photographic paper. The closing of switch 2 effects the application of a voltage from the lines $c$ and $d$ by way of resistor R1 and potentiometer V across the series-connected capacitor C and phototube P. The current through the phototube P is proportional to the intensity of the light incident on the photocathode thereof so that the capacitor C will charge at a rate dependent upon the light incident on the phototube P, to impress a correspondingly increasing positive signal on the first control grid of the tube A. The amplified signal to the tube A as applied to the grid of tube D will increase to a point where the tube D will fire to energize the relay solenoid 1 and thereby open switch S and close switch S'. The opening of switch S opens the energizing circuit of the lamp B to deenergize the lamp and terminate the exposure, and the closing of switch S' shunts and discharges the capacitor C to ready it for the next exposure. The switches 2 and 3 are then opened and the above cycle may be repeated. It is clear from the above that a proper and accurate exposure time is automatically obtained which is a function of the projected image density of a preselected section of the negative and that the requirement of any preexposure measurements is obviated.

Accordingly, with this apparatus the two stage operation of light measurement and exposure based on the result of said measurement is unnecessary and the enlargement operation is efficiently carried out. In this example, as is clear from the above description, during exposure of the printing paper to the energized enlarger bulb B it is necessary that the dark room safe light is kept out completely. In this example, on closing the coupled switches 2 and 3, by means of a further switch not illustrated coupled to said two switches the dark room safe light circuit must be broken.

Figure 2:
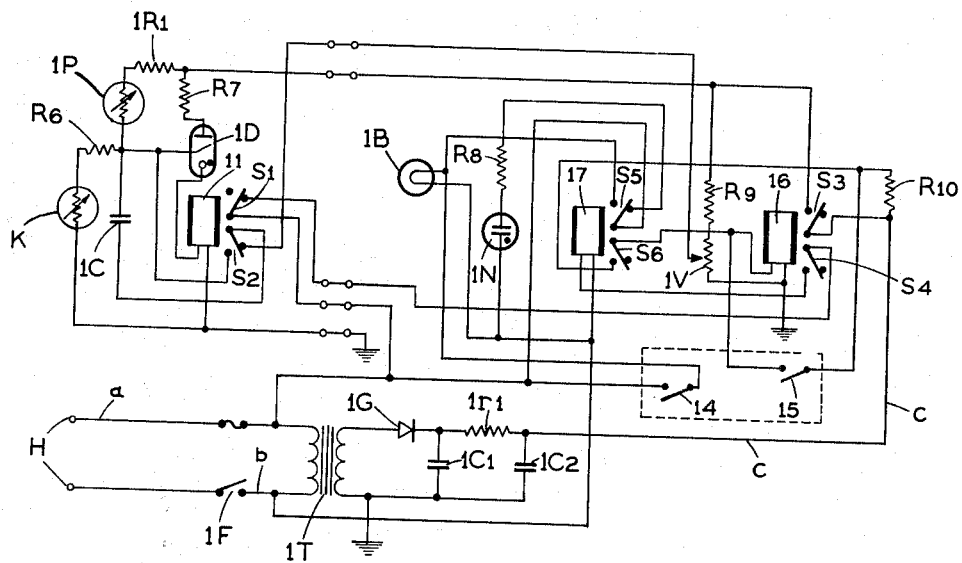
FIGURE 2 is a schematic view of another automatic exposure time control network employing safe light compensating means.

Referring now to FIGURE 2 of the drawing, as in the circuit network of FIGURE 1, there are provided an exposure control photoelectric tube 1P, a control capacitor 1C, a gird controlled gas tube 1D, a transformer 1T the primary of which is connected through a power switch 1F to alternating current lines $a$ and $b$ and the secondary of which is connected by way of a rectifier 1G and a filter network including by-pass capacitors 1C1 and 1C2 connected by a resistor 1r1 between a positive voltage line $c$ and ground, and an enlarger lamp 1B. In addition there are provided relay solenoids 11, 16, and 17, the solenoid 11 actuating the normally open switch S1, and double throw switch S2, the solenoid 16 actuating the normally open switches S3 and S4 and the solenoid 17 actuating a double throw switch S5 and a normally open switch S6. Also provided is a safe light compensating photoelectric tube K.

The anodes of phototube 1P and gas triode 1D are connected through resistors 1R1 and R7 respectively to the switch S3, and through the series connected resistor R9 and the resistance element of a potentiometer 1V to ground. The cathode of phototube 1P is connected to the control grid of gas triode 1D and to one terminal of the control capacitor 1C the other terminal of which is connected to the arm of switch S2. The cathode of the gas triode 1D is grounded through the relay solenoid 11.

The compensating photoelectric tube K is connected to the control photoelectric tube 1P via a resistor R6, the tube K being thus inserted in shunt of the capacitor 1C charging circuit the anode thereof being connected to the cathode of phototube 1P and capacitor 1C and the cathode thereof being grounded. In practice it is desirable that the compensating photoelectric tube K should be placed near the control photoelectric tube 1P. However, it must not be placed in the field of exposure of the enlarger bulb 1B. Further, it must be placed at such a position that its light receiving surface is not obstructed by the printing paper placed on the enlarger stand. Tube K must be so positioned that it receives light of intensity which coincides with that of the dark room safe light received by the control photoelectric tube 1P placed under the printing paper. To produce the same condition, its light receiving surface is provided with a nonadjustable optical control member such as a diffusion filter, a neutral density filter or an adjustable optical control member such as an iris diaphragm or a polarized screen.

The normally open contact of the switch S2 is connected to the control grid of gas triode 1D and the normally closed contact is connected to the arm of potentiometer 1V. The relay solenoid 16 has one terminal grounded and its other terminal is connected by way of a normally open switch 15 and a series resistor R10 to the positive line c, the relay switch S6 shunting the switch 15. One terminal of relay solenoid 17 is connected to line b and the other terminal is connected by way of series-connected switches S4 and S1 to line a. The enlarger lamp 1B has one terminal connected to the normally open contact of switch S5 and to line a by way of a switch 14 while its other terminal is connected to line b. The arm of switch S5 is connected to line a and the normally closed contact thereof is connected by way of the series-connected resistor R8 and neon signal bulb N to line b.

The application of the enlarger employing the circuit network of FIGURE 2 is similar to that earlier described. The focussing, the positioning of the control phototube 1P, and other preliminary procedures are effected in like manner by first energizing the bulb 1B by closing switch 14. In order to effect the automatic exposure, the switch 14 is opened and the switch 15 is momentarily closed to energize solenoid 16 and thereby close switches S3 and S4. The closing of switch S4 completes the energization circuit of relay solenoid 17 by way of normally closed relay switch S1 to thereby close switch S6 and close and open respectively the normally open and closed contacts of switch S5. The closing of switch S6 shunts switch 15 to maintain the solenoids 16 and 17 in an energized state. The closing and opening of the respective contacts of switch S5 energizes the lamp 1B and deenergizes the lamp 1N. The closing of switch S3 completes the circuit including the tubes K, 1P and 1D, and the relay solenoid 11 to the positive line c. The control or integrating capacitor 1C will charge at a rate proportional to the light incident on the phototube 1P and inversely proportional to the light incident on the phototube K to produce a voltage which is proportional to the light produced by the selected area of the projected image as determined by the conductivities of phototube 1P and compensating phototube K as earlier described. When the charge accumulated by the capacitor 1C reaches a predetermined voltage the signal it applies to the control grid of gas triode 1D fires the tube 1D thereby energizing the solenoid 11 to open switch S1 and open and close the closed and open contacts of switch S2. The opening of switch S1 opens the circuit of and deenergizes solenoid 17 to return switch S5 to its normal position to deenergize the lamp 1B and terminate the automatic exposure, and actuate lamp 1N and open switch S6 which opens the circuit of and deenergizes relay 16 to open switches S3 and S4 to deenergize the measuring and control network including the phototubes and gas tubes and to disable the energizing current of relay solenoid 17. In addition, the momentary closing of switch S2 prior to the return of the solenoid 11 to its deenergized state fully discharges the capacitor 1C. The apparatus is now in condition for a repetition of the above cycle.

In the apparatus shown in FIGURE 2, there are various technical difficulties in placing the compensating photoelectric tube K at an appropriate position so that the dark room safe light falls on it under the same condition as that for the control photoelectric tube 1P. The above difficulty is overcome by the circuit network illustrated in FIGURE 3 of the drawings which differs from that illustrated in FIGURE 2 only in the provision of a neon bulb Q or other suitable variable light source disposed adjacent to and exposing the compensating photoelectric tube K, the bulb Q being connected by way of a resistor $R_0$ and a rheostate Z which are connected in series with the bulb Q to the alternating current line. As seen in FIGURE 4, the bulb Q and the phototube K are mounted on the stand 19 and enclosed in an opaque housing 18 whereas in the earlier embodiment, the phototube K is exposed to the safe light radiation. In all other respects the circuit networks of FIGURES 2 and 3 are identical and the same references designate the respective corresponding components. The use of the apparatus last described is similar to that previously described except that the rheostat Z is first adjusted to a point where the light from bulb Q incident on the photoelectric tube K is at a value which compensates for the deviation introduced by the light from the safe light incident on the photoelectric tube P. Thus since the photoelectric tube K is shielded from outside light, its position relative to outside light sources is of no importance.

While there have been described and illustrated preferred embodiments of the present invention it is apparent that numerous alterations, omissions and additions may be made without departing from the spirit thereof.

What is claimed is:

1. A photographic enlarger comprising a light permeable member adapted to support a sheet of photographic paper having a sensitized face and a rear face, means including a first electric lamp for projecting an image to be printed upon said sensitized face, a first photoresistance element supported adjacent to and directed toward said sheet rear face, means including a solenoid-actuated switch connecting said projector lamp to a source of electric current, a capacitor connected to said first photoresistance element whereby the charge on said capacitor is a function of the integrated current through said photoresistance element, means responsive to the charge on said capacitor for controlling the opening and closing of said switch and a second compensating photoresistance element connected in shunt with said capacitor and exposed to non-image-forming light to discharge said capacitor at a rate in accordance with the intensity of said non-image-forming light incident on said second compensating photoresistance element.

2. A photographic enlarger comprising a light permeable photographic paper support member having front and rear faces, means including an electric lamp for projecting an image to be printed toward said support member front face, a first photoresistance member movably supported behind and directed toward said support member rear face, a solenoid, a first switch actuated by said solenoid between open and closed positions, said projector lamp connected through said switch to a source of current, a grid-controlled gas discharge tube having cathode and anode electrodes connected through said solenoid to a voltage source and a control grid, a control capacitor connected through said first photoresistance member to a source of charging current, means coupling said capacitor to said control grid for applying a signal thereto, means for discharging said capacitor, and a second compensating photoresistance member connected in shunt with said capacitor and exposed to non-image-forming light to discharge said capacitor at a rate in accordance with the intensity of said non-image-forming light incident on said second compensating photoresistance element.

3. The enlarger of claim 2 wherein said capacitor is connected between said cathode and said control grid.

4. The enlarger of claim 2 wherein said capacitor coupling means includes an amplifier whose output is connected to said control grid and whose input is connected to said capacitor.

5. The enlarger of claim 2 wherein said capacitor discharging means includes a second switch actuated by said solenoid.

6. The enlarger of claim 5 wherein said first and second switches are substantially simultaneously opened and closed upon energization of said solenoid.

7. The enlarger of claim 2 including a light source disposed in confronting proximity to said second photoresistance member and means for varying said light source.

8. An automatic exposure circuit network comprising a first relay solenoid, an amplifier tube having output electrodes connected in series with said relay solenoid to a source of current and a control grid, a capacitor coupled to said control grid, a first switch and a second normally open switch actuated by said solenoid, a projector lamp, means controlled by said first switch connecting said lamp to a source of current, a said second switch being connected across said capacitor, a first photoresistance member exposed to the light from said projector lamp and connected in series with said capacitor to a source of current, second and third relay solenoids, a third double throw switch having an arm and normally open and closed contacts and a normally open switch actuated by said second solenoid, and normally open fifth and sixth switches actuated by said third solenoid, said first switch being normally closed and said second switch being a double throw switch including an arm and a normally open and a normally closed contact, said second solenoid being connected through said sixth and first switches to a source of current, said third solenoid being connected through said fourth switch to a source of current, said projector lamp having a terminal connected to said third switch normally open contact, the arm of said third switch being connected to a source of current, said first photoresistance member and said amplifier tube being connected to a source of current through said fifth switch, and said capacitor being connected to a source of current through the arm and normally closed contact of said second switch.

9. The network of claim 8 including a signal lamp connected to a source of current through the arm and normally closed contact of said third switch.

10. The network of claim 8 including a normally open hand actuated switch connected between said third solenoid and its source of current.

11. A photographic enlarger comprising a light permeable photographic paper support member having front and rear faces, means including an electric lamp for projecting an image to be printed toward said support member, a first photosensitive member, means adjustably positioning said first photosensitive member along said support member rear face, an index member, means adjustably positioning said index member along said support member front face selectively in substantial coincidence with said first photosensitive member and independently thereof, means including a solenoid-actuated switch connecting said projector lamp to a source of electric current, a capacitor connected to said first photoresistance element whereby the charge on said capacitor is a function of the integrated current through said photoresistance element, means responsive to the charge on said capacitor for controlling the opening and closing of said switch, and a second compensating photoresistance element connected in shunt with said capacitor and exposed to non-image-forming light to discharge said capacitor at a rate in accordance with the intensity of said non-image-forming light incident on said second compensating photoresistance element.

References Cited by the Examiner
UNITED STATES PATENTS

| | | | |
|---|---|---|---|
| 1,990,396 | 2/1935 | Ballard | 88—24 X |
| 2,444,675 | 7/1948 | Rath | 88—24 |
| 2,853,921 | 9/1958 | Biedermann et al. | 88—24 |
| 2,860,561 | 11/1958 | Pennington. | |
| 2,985,086 | 5/1961 | Craig | 88—24 X |
| 2,990,757 | 7/1961 | Ponsar. | |
| 3,000,286 | 9/1961 | Elphick | 88—24 |
| 3,077,401 | 2/1963 | Van der Grinten et al. | 88—24 X |
| 3,117,490 | 1/1964 | Byrd | 88—24 |

FOREIGN PATENTS 762,303 11/1956 Great Britain.

EVON C. BLUNK, *Primary Examiner.*

EMIL G. ANDERSON, NORTON ANSHER,
*Examiners.*